United States Patent [19]

Seidler

[11] Patent Number: 4,990,016
[45] Date of Patent: Feb. 5, 1991

[54] LIQUID APPLICATOR SAMPLER TUBE

[76] Inventor: David Seidler, 69-10 108th St., Forest Hills, N.Y. 11375

[21] Appl. No.: 285,442

[22] Filed: Dec. 16, 1988

[51] Int. Cl.⁵ ........................ A46B 11/00; A46B 11/02
[52] U.S. Cl. .................................... 401/268; 401/132; 401/269; 401/288
[58] Field of Search ............... 401/288, 269, 268, 132, 401/183, 132, 287; 222/107

[56] References Cited

U.S. PATENT DOCUMENTS

| 64,732 | 5/1967 | Wylie | 401/174 |
| 158,943 | 1/1875 | Hussey | 401/269 |
| 1,146,522 | 7/1915 | Robert | 401/269 X |
| 3,777,949 | 12/1973 | Chiquiari-Arias | 401/132 X |
| 3,993,223 | 11/1976 | Welker, III | 222/107 |

FOREIGN PATENT DOCUMENTS

| 2165826 | 2/1982 | Fed. Rep. of Germany | 401/132 |
| 3122237 | 1/1983 | Fed. Rep. of Germany | 401/132 |
| 933308 | 12/1947 | France | 401/288 |
| 1129135 | 1/1957 | France | 401/183 |
| 2310106 | 12/1976 | France | 401/132 |
| 464858 | 6/1951 | Italy | 401/269 |
| 471886 | 5/1952 | Italy | 401/288 |
| 61729 | 11/1939 | Norway | 401/183 |
| 2096888 | 10/1982 | United Kingdom | 401/287 |
| 8806017 | 8/1988 | World Int. Prop. O. | 401/132 |

Primary Examiner—Steven A. Bratlie
Attorney, Agent, or Firm—Blum Kaplan

[57] ABSTRACT

A disposable liquid applicator includes a plastic tube with a tapered neck portion. A brush holder is disposed in the neck portion and includes bristles extending outwardly therefrom. A cap is integrally formed with the neck of the tube and encloses the bristles. The neck includes an annular reduced thickness portion surrounding the brush holder adjacent the cap which is removed by breaking the cap at the reduced thickness portion. The brush holder covers the reduced thickness portion and prevents leakage therefrom during storage.

6 Claims, 2 Drawing Sheets

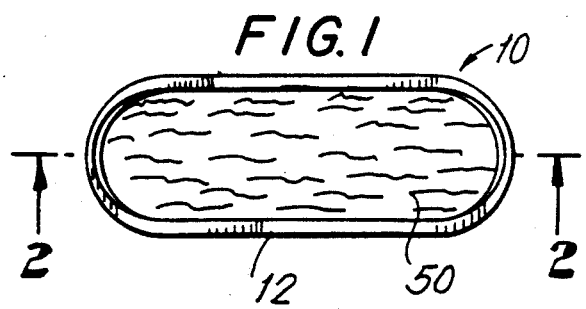
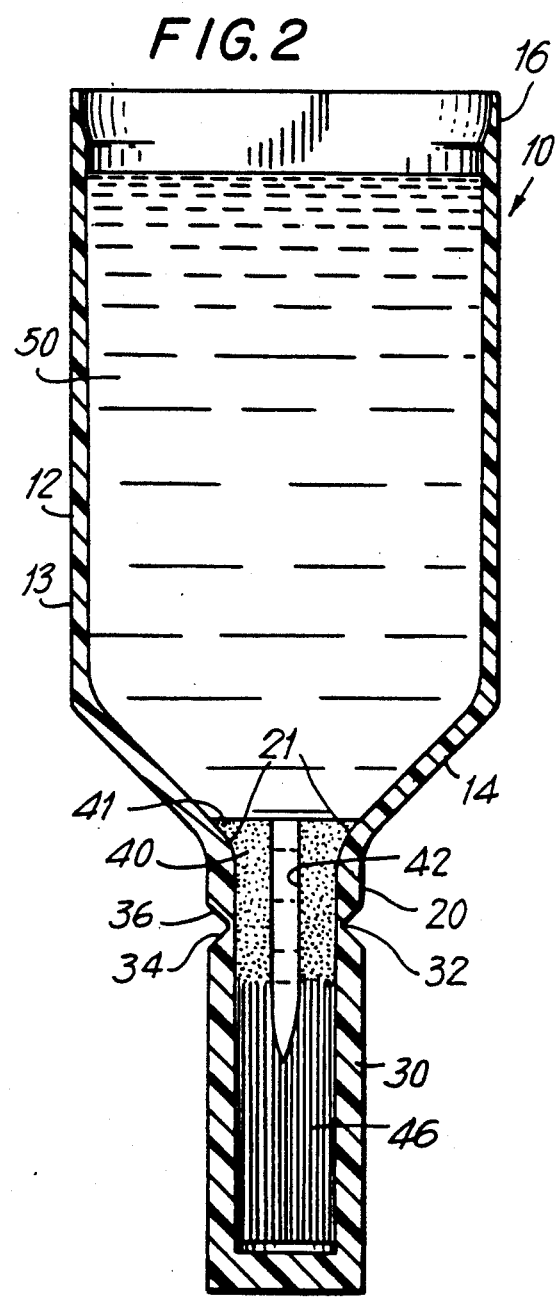
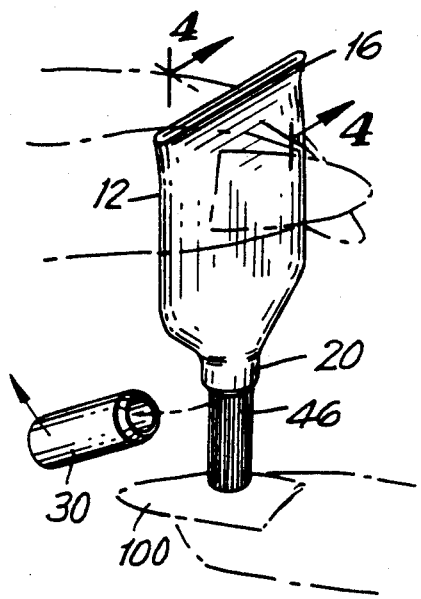

LIQUID APPLICATOR SAMPLER TUBE

BACKGROUND OF THE INVENTION

The present invention is directed generally to a liquid applicator sampler tube and, in particular, to a plastic nail enamel sample applicator which includes a sealed brush unit with a break away cap.

There are numerous cosmetic products on the market today including many different brands of nail polish. Each brand of nail polish comes in a plurality of colors, finishes and shades. Consumers of such products often desire to test such products on their fingernails prior to purchase.

Nail polish is generally sold in glass bottles with a removable screw cap having a brush attached to the cap. The brush is dipped in the container for application of the polish therein. Consumers who desire to test such products often remove the cap in the store prior to purchase and test the product from containers intended for actual sale. Such a procedure causes the product to become unsalable, or the customer who purchases such used product unwittingly purchases a contaminated product with less than the full amount provided by the manufacturer.

Accordingly, it is desired to provide a liquid applicator sampler tube such as a nail enamel sample applicator which is inexpensive to manufacture, contains a minimum amount of nail polish and yet which permits the consumer to test the actual product before purchase thereof in a larger quantity. The present invention provides such a product.

SUMMARY OF THE INVENTION

Generally speaking, in accordance with the present invention, a disposable liquid applicator is provided. The liquid applicator includes a tube formed from a plastic material having a first end and a second end. A predetermined amount of a liquid to be applied, such as nail polish, is provided in the tube. The first end of the tube includes a tapered neck portion and a brush holder is disposed in the neck portion and includes bristles extending outwardly therefrom. A cap is formed integrally with the neck portion of the tube. The cap encloses the bristles. The neck portion of the tube includes an annular reduced thickness portion surrounding the brush holder adjacent the cap. The brush holder prevents liquid in the tube from escaping through the reduced thickness portion. The cap is removable from the tube by breaking it off at the reduced thickness portion.

Accordingly, it is desired to provide an improved disposable liquid applicator.

Another object of the present invention is to provide a nail enamel sampler tube formed from a plastic material which holds a small amount of nail polish.

A further object of the present invention is to provide a nail enamel sampler tube having a break away cap which does not leak during storage.

A still further object of the present invention is to provide a liquid applicator sampler tube which is easy and inexpensive to manufacture.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a top plan view of a liquid applicator sampler tube constructed in accordance with a first embodiment of the present invention;

FIG. 2 is a sectional view taken along line 2—2 of FIG. 1;

FIG. 3 is a perspective view of a liquid applicator sampler tube with the cap shown removed from the tube and demonstrating application of nail enamel to a fingernail of a user;

DETAILED DESCRIPTION OF THE PREFERRED EMBODIMENTS

Figure 4:
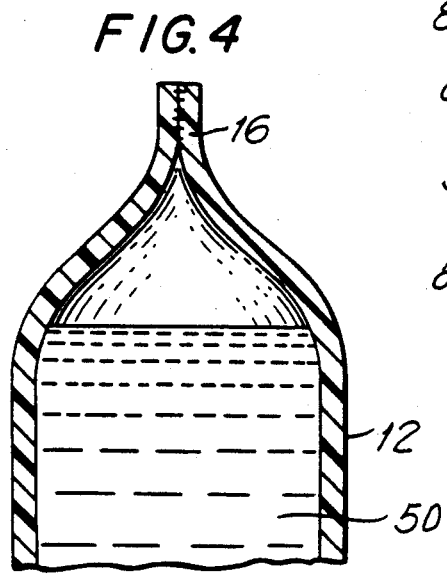
FIG. 4 is an enlarged sectional view taken along line 4—4 of FIG. 3.

Reference is first made to FIGS. 1 and 2 which depict a liquid applicator sampler tube, generally indicated at 10, constructed in accordance with a first embodiment of the present invention. Liquid applicator 10 is formed from a tube 12, preferably molded from a flexible plastic material such as polypropylene or polyethylene. Tube 12 includes a first end 14 and a second end 16. First end 14 is tapered to form a neck portion 20.

A cap 30 is formed integrally with neck 20 at a reduced thickness portion 32 formed by inclined walls 34 and 36. A brush holder 40 having bristles 46 extending therefrom is supported in neck 20 of tube 12. The brush and holder may be integrally formed according to the method described in my co-pending U.S. patent application Ser. No. 06/912,295 filed on Sept. 29, 1986, now U.S. Pat. No. 4,795,218. Brush holder 40 extends to cover reduced thickness portion 32. An opening 42 is provided in brush holder 40 to permit liquid within tube 12 to flow onto bristles 46.

At neck portion 20, inner wall 21 is tapered to permit easy insertion of brush 46 therethrough and to prevent damage to the bristles during manufacture.

After the applicator is constructed and formed as described above, a liquid 50, such as nail polish or nail enamel, is loaded in tube 12. After loading, second end 16 of tube 12 is sealed in an appropriate manner to complete the construction.

In the embodiment depicted in FIGS. 1 through 4, second end 16 of tube 12 is crimped together and then heat sealed. In the embodiment depicted in FIGS. 5 and 6, second end 81 of tube 80 is sealed through a sonic sealing process.

The general thickness of wall 13 forming tube 12 is about 0.4 mm. Second end 16 of tube 12, where crimping occurs, is approximately 0.2 mm. The thickness of reduced thickness portion 32 is about 0.1 mm in order to permit easy breaking off of cap 30.

With the general thickness of wall 13 at 0.4 mm, nail enamel 50 in tube 12 will be sustained without any deterioration of the plastic material forming the tube. However, at the reduced thickness portion 32, the thinness of the wall may permit deterioration and leakage. The present invention provides that the brush holder 40 extends to cove reduced thickness portion 32 internally so that the nail polish enamel contained in the container will not contact the reduced thickness portion and therefore the solvent contained in the nail enamel will not cause deterioration of the plastic wall.

In addition, it is preferred that the inner diameter of cap 30 have a snug fit against bristles 36 to prevent flooding of the bristles when the cap is twisted off. Accordingly, it is preferred that the inner diameter of cap 30 be substantially equal to the diameter of bristles 36.

Although the unit is considered as a disposable unit, it is noted that the cap can be reinserted over bristles 46 after removal in order to provide temporary storage.

A first end 41 of brush holder 40 is flared outwardly so that when the brush holder is inserted in neck portion 14 of tube 12 during manufacture, it will seat tightly against the neck so that fluid only flows through opening 42 in the brush holder.

Figure 5:
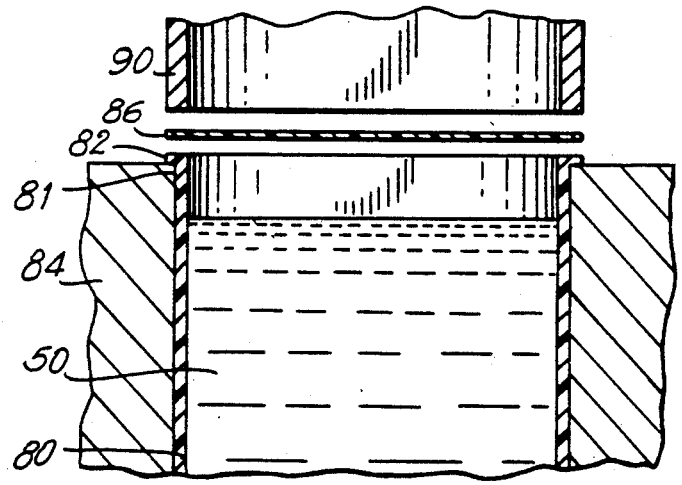
FIG. 5 is a partial sectional elevational view showing an alternative method for sealing the open end of the tube.
Figure 6:
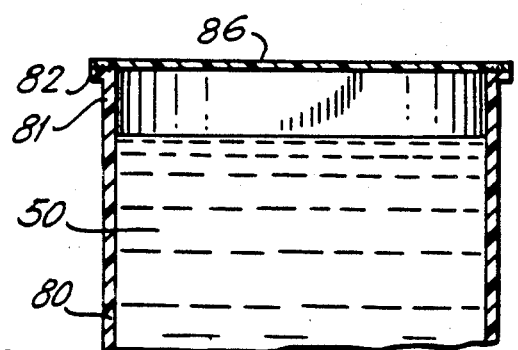
FIG. 6 is a view similar to FIG. 5 showing the completed end of the tube after sealing has occurred according to the alternative method.

In the sonic sealing embodiment depicted in FIGS. 5 and 6, tube 80 includes an upper annular rim 82 which seats against a holder 84 during manufacture. A plastic strip 86 is positioned over annular rim 82 and a sonic head 90 presses strip 86 against rim 82 which is then sonically sealed thereon as best depicted in FIG. 6. Plastic strip 86 can be fed from a strip feed section in order to automate the manufacturing process.

The present invention provides an easy to manufacture and inexpensive liquid applicator sampler tube which is ideal for use in sampling of nail polish. Other multiple uses, such as with paint or the like is also encompassed within the scope of the present invention. In a preferred embodiment, the tube is about 8 mm in thickness, about 14.5 mm in width and about 22 mm in length to permit a sufficient supply of liquid, such as nail enamel, to be contained therein to permit coating of all ten nails.

The cap is readily removable by twisting or breaking at the reduced thickness portion. After removal of cap 30, as depicted in FIG. 3, nail enamel within tube 12 will flow through the opening 42 in brush holder 40 and onto bristles 46. Thereafter, the enamel on bristles 46 can be applied to the nails of a user such as nail 100 depicted in FIG. 3.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A disposable liquid applicator for applying a liquid to a surface comprising a one-piece tube formed from a plastic material capable of holding said liquid therein having an annular first end and a second end, said first end of said tube having a tapered neck portion, a circular brush holder disposed in said neck portion having bristles formed integrally therewith extending outwardly therefrom, said brush holder having a flared annular end which seats tightly in said neck portion, cap means integrally formed with the first end of said tube, said cap means enclosing said bristles, said neck portion including an inner wall, said inner wall being tapered to permit easy insertion of said bristles therethrough when manufactured, said neck portion having an annular reduced thickness portion surrounding said brush holder adjacent said cap means, said flared annular end of said brush holder positioning said brush holder to extend across said annular reduced thickness portion of said neck portion, said brush holder preventing liquid in said tube from escaping through said reduced thickness portion, said cap means being removable from said tube by breaking at said reduced thickness portion.

2. The liquid applicator as claimed in claim 1, wherein said plastic material forming said tube is flexible.

3. The liquid applicator as claimed in claim 2, wherein said flexible plastic material is selected from the group consisting of polypropylene and polyethylene.

4. The liquid applicator as claimed in claim 1, wherein said second end of said tube is sealed by a crimp.

5. The liquid applicator as claimed in claim 1, wherein said second end of said tube is sealed by a sonic seal.

6. The liquid applicator as claimed in claim 1, wherein said cap means has an inner diameter and said bristles have a predetermined diameter, said inner diameter of said cap means being substantially equal to the diameter of said bristles.

* * * * *